United States Patent [19]

Viaud

[11] 4,399,746

[45] Aug. 23, 1983

[54] STAGGERED ROLLS AND BELTS FOR ROUND BALER

[75] Inventor: Jean Viaud, Gray, France

[73] Assignee: Deere & Company, Moline, Ill.

[21] Appl. No.: 285,178

[22] Filed: Jul. 20, 1981

[51] Int. Cl.³ .............................................. B30B 5/06
[52] U.S. Cl. .................................................... 100/88
[58] Field of Search ................ 100/88, 5; 56/341, 343

[56] References Cited

U.S. PATENT DOCUMENTS

| | | | |
|---|---|---|---|
| 4,182,101 | 1/1980 | Gaeddert et al. | 56/341 |
| 4,224,867 | 9/1980 | Gaeddert et al. | 56/341 X |
| 4,252,057 | 2/1981 | Gaeddert et al. | 100/88 |

*Primary Examiner*—Peter Feldman

[57] ABSTRACT

A baler for making round bales is provided with a plurality of rolls and belts constituting a bale chamber having a crop inlet to which hay and the like is fed via a conventional pick-up mechanism. Two of the rolls are arranged as a set of first and second closely spaced apart, parallel rolls. Some of the belts are trained about only one roll of the set and about a group of common rolls in the baler. In one embodiment the other the belts are trained about both the first and second rolls and about the common rolls. The roll set is provided at the crop inlet in the area where the core of the bale is initiated. In a second embodiment the other belts are trained about only the second roll of the set and about the common rolls.

16 Claims, 4 Drawing Figures

STAGGERED ROLLS AND BELTS FOR ROUND BALER

BACKGROUND OF THE INVENTION

Balers of the type to which this invention is directed are well-known and all are quite alike in construction and operation in that each relies upon a plurality of rolls, belts and baler sides to define a bale chamber in which the bale is formed. One of the problems experienced with the conventional round baler is caused by crops becoming entrapped within volumes contiguous with the bale forming chamber and substantially enclosed by the sides of the baler, the rolls and the belts. The crop enters these volumes from the bale forming chamber by passing between the spaces between the longitudinally adjacent belts. When the crops become entrapped within these volumes, it tends to wrap around the rolls which is detrimental to proper belt tracking on the rolls and tends to retard enlargement of the bale forming chamber as the bale grows in size. Eventually, if uncorrected, the belts become bound (or may even break) and bale formation is no longer possible until the wrapped and entrapped hay is removed.

SUMMARY OF THE INVENTION

According to the present invention, this problem is eliminated or at least minimized by the staggering of two adjacent "staggered" rolls. At least one of the plurality of belts is trained around only one of the staggered rolls. In the preferred embodiment, the remaining belts (i.e., the belts not trained about only one of the staggered rolls) are trained about both of the staggered rolls. In a second embodiment, all of the plurality of belts are about only one of the staggered rolls. Some belts are trained about only a first one of the staggered rolls and the other belts are about only a second of the staggered rolls.

In both embodiments, the paths of the belts are preferably alternated between the staggered rolls so that no two adjacent belts travel in the same path about the staggered rolls. The spacing between these two rolls thus leaves open areas for crops that tend to wrap about one roll to escape before wrapping more tightly. Since wrapping and crop entrapment is far less likely to occur, the need for manually periodically scraping crop residue from the rolls and the need for provision of mechanical roll scrapers are reduced. Although the preferred embodiment discloses the set of rolls at the pick-up area or where the core of the bale is initiated, similar sets of rolls may be provided elsewhere in the machine.

DESCRIPTION OF THE PREFERRED EMBODIMENT

Figure 1:
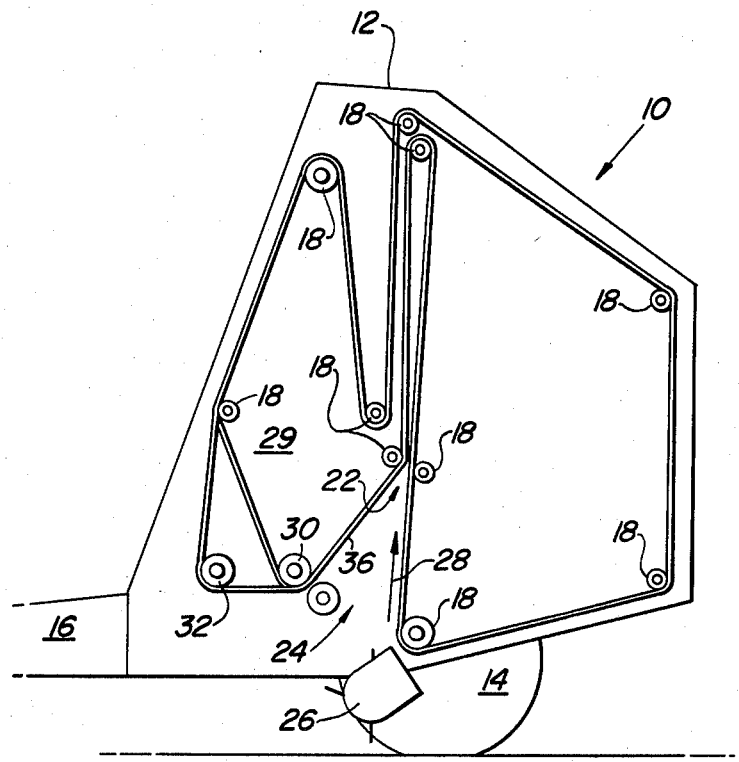
FIG. 1 is a side elevation of a typical round baler, the near side wall having been removed to expose interior parts, in accordance with a preferred embodiment of the invention.
Figure 2:
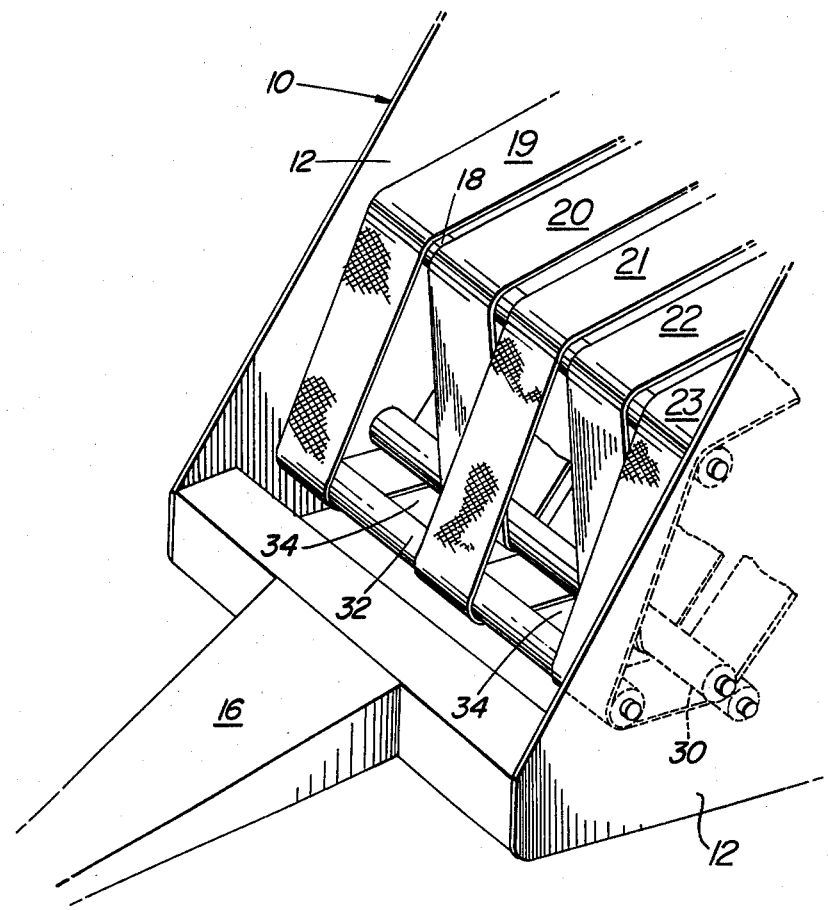
FIG. 2 is a fragmentary perspective, better showing the improved roll and belt arrangement of the baler of FIG. 1.

Reference is now made to FIGS. 1 and 2 illustrative of a baler in accordance with the preferred embodiment of this invention.

The baler shown here is representative of typical round balers, having a supporting structure 10 made up of various cross members (not shown) between a pair of fore-and-aft upright side walls 12. The machine is carried on wheels 14 (one shown) and is drawn behind a tractor (not shown) via a draft tongue 16. A plurality of rolls, including a set of rolls 30, 32 and a group of common rolls 18 extend between and is suitably journaled in the side walls. Belts 19-23 are trained about these rolls to provide a bale-forming chamber 25 opening downwardly at 24 as a crop inlet to receive crops from a conventional pick-up mechanism 26. As is well known, crops introduced into the inlet are rolled by action of the belts to form a core for the eventual bale and certain of the rolls are bodily movably to enable the bale-forming chamber to expand increasingly to accommodate the cylindrical bale. The core of the bale results from oppositely moving stretches of the belts, the arrow 28 indicating the direction of movement of that stretch of the belt from the roll just above the pick-up to the next uppermost roll. Except for rolls 30, 32 and the arrangement of belts 19-23 thereon, the baler described above may be regarded as conventional. The operation of such balers is well known to those skilled in the art and will not be described in detail herein. See, for example, U.S. Pat. No. 4,252,057 as illustrative of the bale forming operation of balers of this general type.

As discussed above, balers of this type are subject to the problem of crop material becoming entrapped in volume contiguous with the bale forming chamber. One exemplary volume, contiguous with chamber 25, in which the crop being baled tends to become entrapped during bale formation is a volume 29 defined by side walls 12, belts 19-23 and rolls 18. In accordance with this invention means are provided for permitting the entrapped crop to escape easily from such volumes. This is accomplished by the arrangement of rolls 30, 32 as a "staggered" set. The roll 30 is power-driven by the power take-off of the tractor (not shown). The set of rolls 30, 32 is preferably located adjacent to the crop inlet 24. Rolls 30, 32 are spaced apart and are preferably fixed as to location; that is, they do not change position as the bale chamber is enlarged during bale formation. As best seen in FIG. 2, alternate belts extend around only one of the staggered rolls 30, 32 (i.e., roll 30) and the remaining belts are trained about both of the staggered rolls 30, 32. The other stretches of all of the belts are trained about the rest of the common rolls 18 as is conventional.

Since the belts in the area of the rolls 30 and 32 are staggered, spaces or openings result at 34 through which crops may escape before causing roll wrapping and a build-up of entrapped crop within volume 29. In accordance with the features of this invention, an advantage resulting from the location of belts 19, 23, which are adjacent sidewalls 12, forward of the belts 20, 22 is that openings 34 are formed inwardly and away from sidewalls 12. This permits crop material to escape more easily to the ground without being entangled around the bearings for rollers 30, 32 or in other components located adjacent sidewalls 12. By way of repetition: certain of the belts are trained about the roll 30 and the common rolls 18 but not about the roll 32, while others of the belts are trained about both of the rolls 30, 32 and the common rolls 18. It should be noted that adjacent or side-by-side stretches 36 of belts 19-23 that run from both the rolls 30, 32 to a next adjacent roll lie in a common plane which will be initially tangent to the core of the bale being formed. As the bale increases in diameter stretches 36 will of course conform to the surface of the bale. Although only five belts are shown, the number may be varied, depending upon the design and size of the baler. Furthermore, and by way of example, if an even number of belts (e.g. six belts) is desired, the preferred belt array is to have the first, third, fourth and sixth belts forward of the second and fifth belts. (The numeric designation is determined by counting in order from one side of the baler to the other.) This array is preferred because as noted above it is advantageous to have the first and sixth belts, which are adjacent to the sidewalls, forward of the second and fifth belts so that openings for permitting crop material to escape are formed inwardly and away from the sidewalls. Also, although the staggering of alternating belts as shown is preferred, other arrangements may be resorted to. For example, if at least one of the belts is staggered from the others, improved performance may be achieved although not to the degree achieved by staggering alternate belts. In certain crop conditions the provision of a fixed bar or plate extending parallel and adjacent to certain of the rolls such as roll 32 may be desirable for scraping the roll(s) to reduce crop wrapping.

Figure 3:
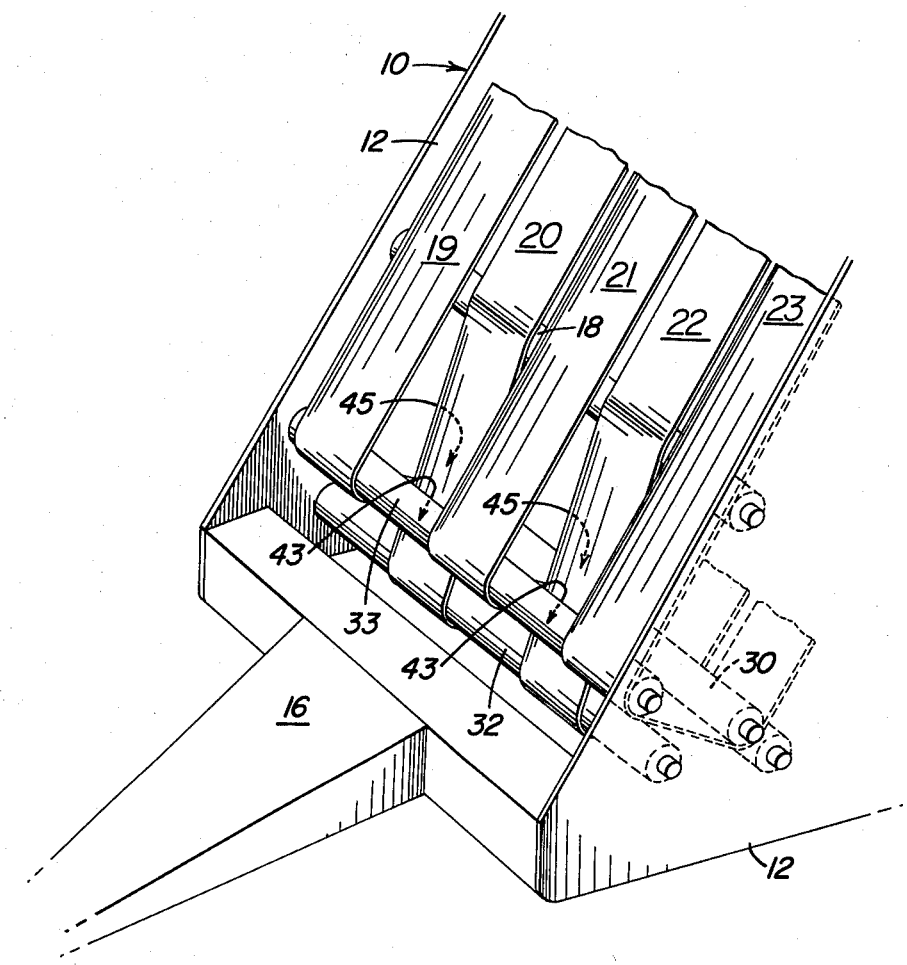
FIG. 3 is a side elevational view similar to FIG. 1, of a baler showing a second embodiment of this invention.
Figure 4:
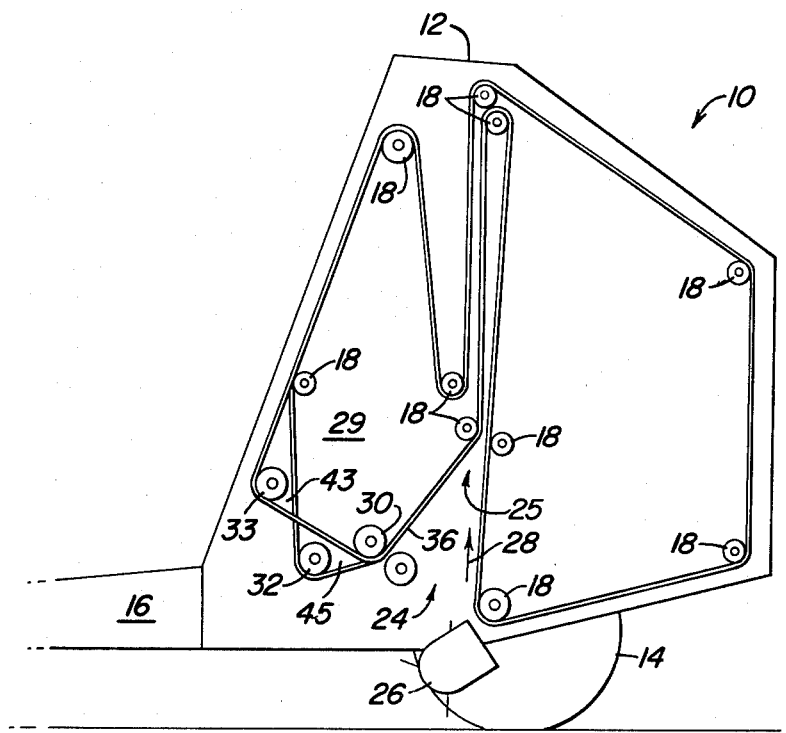
FIG. 4 is a fragmentary perspective view of the front of the baler shown in FIG. 3.

Reference is now made to FIGS. 3 and 4 illustrative of a second embodiment of this invention. The baler shown in FIGS. 3 and 4 is identical to that shown in FIGS. 1 and 2 except for the addition of a roll 33 and the disposition of belts 19-23 about rolls 30, 32, 33. Accordingly, the description of the second embodiment will be limited to these differences. For convenience, the enumeration of the elements in FIGS. 3 and 4 is identical to that of the corresponding elements in FIGS. 1 and 2.

In accordance with the second embodiment, at least one of the plurality of belts 19-23 is trained about only one of a staggered roll pair which, in this embodiment, is constituted by rolls 32, 33. All of the belts 19-23 are trained about only one of the staggered rolls 32, 33. Alternate belts are trained about only roll 32 of the staggered roll pair 32, 33 and the remaining belts are trained only about roll 33 of the staggered roll pair 32, 33. The other stretches of all of the belts 19-23 are trained about the group of common rolls 18 and about roll 30.

Because belts 20 in the area of rolls 30, 32, 33 are staggered, spaces or openings 41, 43 are formed through which crops may escape before causing roll wrapping and a build-up of entrapped crop within volume 29. In summary, certain of belts 19-23 are trained about rolls 30, 32 and common rolls 18 but not about rolls 33. The remaining belts are trained about rolls 30, 33 and common rolls 18 but not about roll 32.

While the invention has been explained in connection with certain embodiments thereof, it would be appreciated by those skilled in the art that staggered roll pairs as described hereinabove may be provided elsewhere in the machine. In addition, other modifications and variation in the arrangement will suggest themselves to those skilled in the art. Accordingly, it is intended that all such modifications and variations be comprehended within the scope of the invention as set forth in the appended claims.

I claim:

1. In a round baler comprising (1) a pair of spaced sides; (2) a plurality of parallel, spaced rolls supported by said sides, said plurality of rolls comprised of a set of two adjacent rolls and a group of common rolls; and (3) a plurality of side-by-side belts supported by said plurality of rolls, defining a bale forming chamber having a crop inlet and defining a volume contiguous of said chamber; the improvement comprising at least one belt entrained about only one roll of said set of rolls and about said group of rolls to define an opening in a lower portion of said volume between said at least one belt and one of said plurality of belts adjacent to said at least one belt, said opening permitting crop material to escape from said volume.

2. The baler of claim 1 wherein others of said plurality of belts are trained about only the other roll of said set and about the group of rolls.

3. The baler of claim 1 wherein others of said plurality of belts are trained about both rolls of said set and about the group of rolls.

4. A round baler as in claim 1 or 3, wherein that said set of rolls is arranged at the crop inlet.

5. A round baler as in claim 2, wherein every other belt is trained about said one roll and the remaining belts are trained about said other roll.

6. The baler of claim 3 wherein every other belt is trained about only said one roll and about said group of rolls and the remaining belts are trained about both rolls of said set and about said group of rolls.

7. A round baler as in claim 6, wherein that said set of rolls is arranged at the crop inlet.

8. A round baler as in claim 1 wherein that said set of rolls is fixed as to location in the supporting structure.

9. A round baler as in claim 1, wherein said one roll is spaced forwardly of the other of said set; said one belt is adjacent to one of said sides; a second of said plurality of belts is located adjacent to the second of said sides and is entrained about said one roll; said one, said second a third and fourth of said plurality of belts adjacent, respectively, to said one and second belts form a pair of said openings spaced inwardly and away from said sides.

10. The baler of claim 9 wherein others of said plurality of belts are entrained about the other roll of said set and about the group of rolls.

11. The baler of claim 9 wherein others of said plurality of belts are trained about both rolls of said set and about the group of rolls.

12. A round baler comprising (1) a pair of spaced sides; (2) a plurality of parallel, spaced rolls supported by and extending between said sides, said plurality of rolls comprised of a set of two adjacent rolls and a group of common rolls; and (3) a plurality of side-by-side belts between said sides and supported by said plurality of rolls, and defining a bale forming chamber having a crop inlet; the improvement comprising at least two of said plurality of belts entrained about only one roll of said set of rolls and about said group of rolls.

13. The baler of claim 10 wherein the others of said plurality of belts are entrained about only the roll of said set and about the group of rolls.

14. The baler of claim 10 wherein others of said plurality of belts are entrained about both rolls of said set and about the group of rolls.

15. The round baler of either claims 12, 13, or 14 wherein said set of rolls is adjacent to the crop inlet.

16. The round baler of either claims 12, 13, or 14 wherein:

said plurality of belts define a volume contiguous with said bale forming chamber.

said one roll is spaced forwardly of the other roll of said set;

said at least two belts are located respectively adjacent to one of said pair of sides;

said plurality of belts includes a third and fourth belt respectively adjacent to one of said at least two belts entrained about said one roll; and said at least two belts and said third and fourth belts adjacent thereto form in said volume a pair of openings spaced inwardly and away from said sides, said openings permitting crop material to escape from said volume.

* * * * *